April 22, 1958        L. H. STITT        2,831,271
APPARATUS AND METHOD OF MOUNTING ANIMAL SKINS
Filed April 5, 1954        2 Sheets—Sheet 1
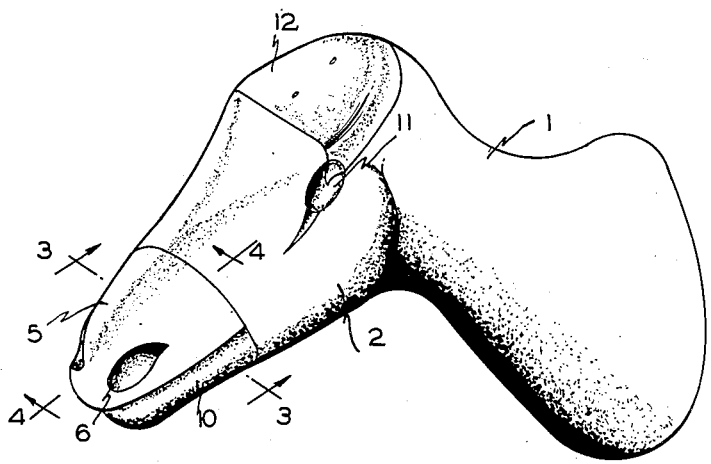
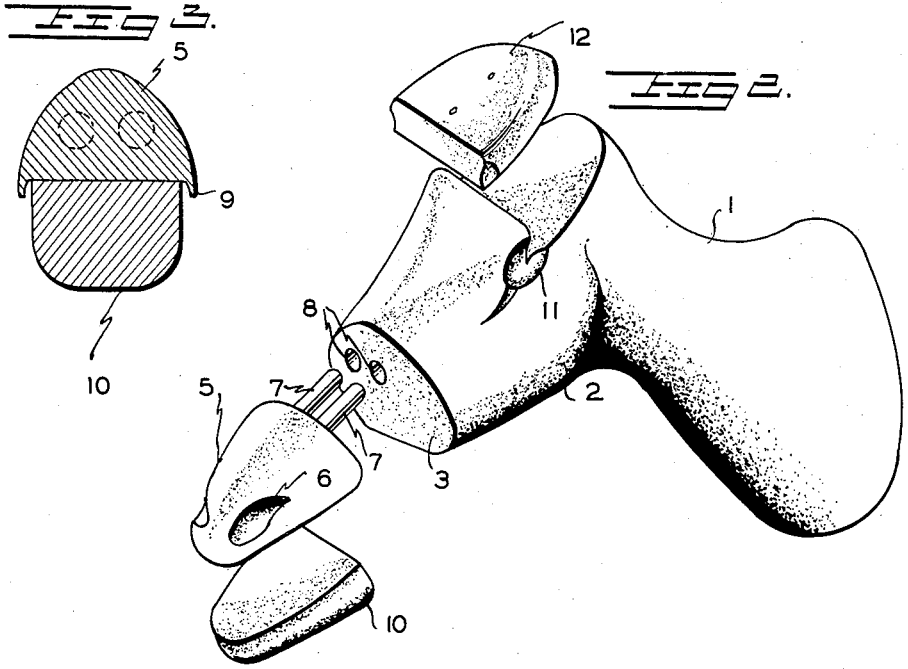
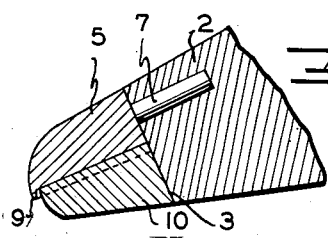
INVENTOR
LAWRENCE H. STITT
BY
ATTORNEY

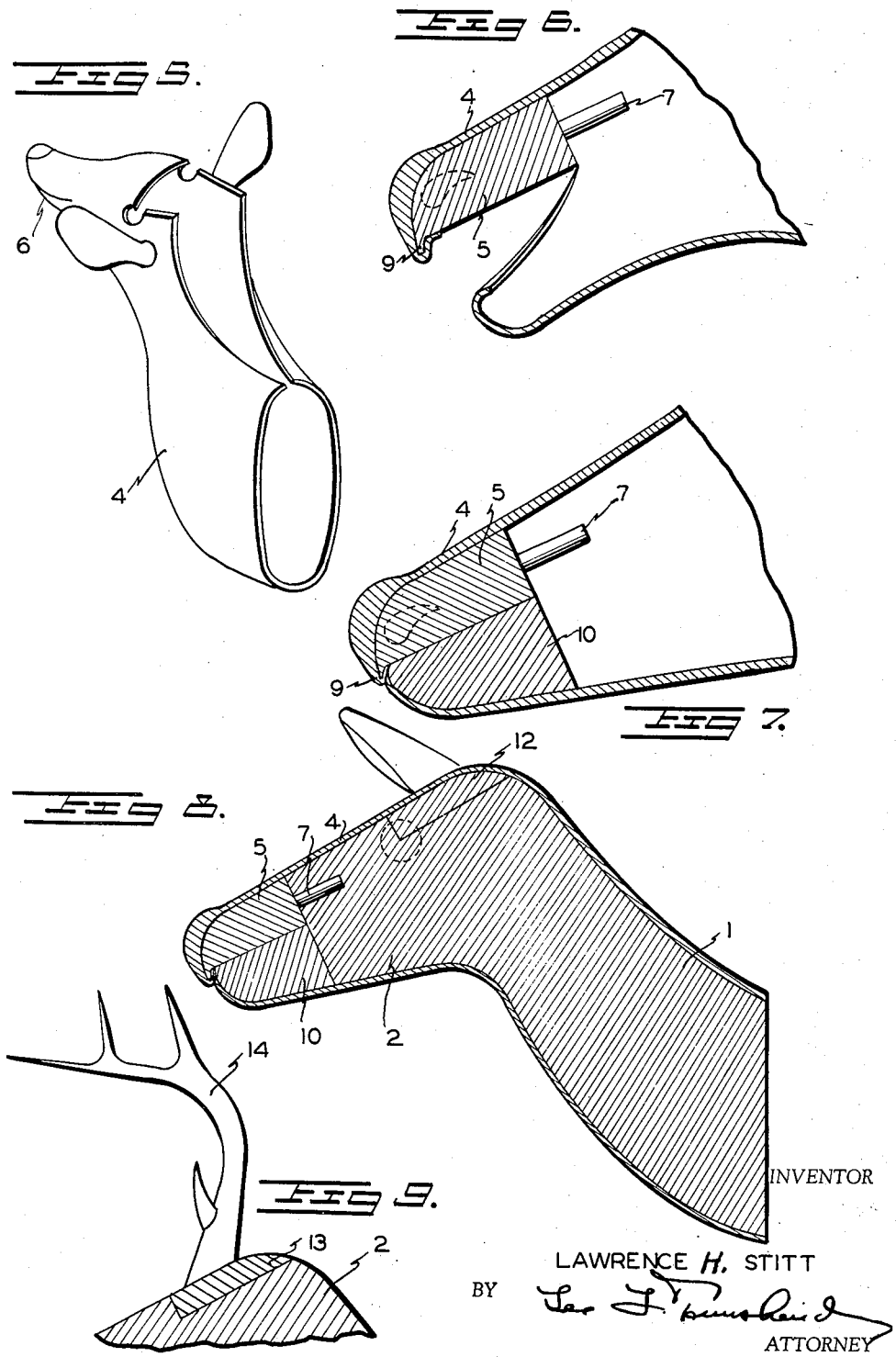

United States Patent Office 2,831,271
Patented Apr. 22, 1958

2,831,271

APPARATUS AND METHOD OF MOUNTING ANIMAL SKINS

Lawrence H. Stitt, Monaca, Pa.

Application April 5, 1954, Serial No. 421,092

8 Claims. (Cl. 35—20)

This invention relates to an improvement in the mounting of animal skins and has particular reference to mounting the head portion of the animal so that it may result in a life-like appearance with durable lasting qualities.

The primary object of the invention is to provide a mount for the head portion of an animal skin that has these qualities and which requires a minimum amount of skill and training on the part of the person mounting the skin to attain this result.

Another object of the invention is to provide a new method of mounting the head portion of an animal skin whereby the skin is sequentially applied to separable parts of a form, as mounted, which greatly simplifies this operation.

A further object of the invention is to provide an animal head mount for the skin that is applicable whether the animal has horns or not.

Other and incidental objects will be apparent from the following description in conjunction with the accompanying drawings, in which:

Figure 1 is an assembled view of the form upon which the head portion of the skin is mounted;

Figure 2 is an exploded view thereof;

Figure 3 is a cross section on the line 3—3 of Figure 1;

Figure 4 is a longitudinal section on the line 4—4 of Figure 1;

Figure 5 diagrammatically illustrates a cured head portion of an animal skin ready for mounting;

Figure 6 is a section showing the nose, jaw and upper lip conforming section of the form in position in the skin;

Figure 7 is a similar view with the lower jaw and lip holding section of the form added;

Figure 8 is a section of the entire head form with the skin in position thereon; and Figure 9 is a partial section of the top of the form with a portion of the skull and horns of the animal substituted for the top block of the form.

The mounting of skins of the vertebrata family of animals is a common practice. Where the entire skin is mounted, it is usually to obtain natural history specimens but the most common practice of this art is to mount merely the head portion of the animal skin and secure it to a wall plaque or the like for use as a trophy. This invention primarily relates to a head mount of usually a doe or buck deer but it is not restricted to such a use and may be used in conjunction with mounting the entire skin of any animal of this family. For illustrative purpose, it is only shown for mounting the head portion.

Work of this character is usually done by taxidermists who are highly skilled artisans. The curing and cutting of the skin is well known in the art and forms no part of this invention. The cured and cut skin is pulled over a previously prepared suitable form but it has been found difficult to duplicate the natural facial expression of the animal in life by this method.

Various means have been resorted to such as changing the contour of the head form by cutting away or building up portions with wax but these have not been satisfactory and usually in time the head mount deteriorates and loses the natural fresh expression desired. Furthermore, a high degree of skill is necessary for such work and under the usual method employed, no permanence results. In Figure 5 of the drawings is illustrated diagrammatically a cured and cut skin of the head portion of an animal skin to be mounted. Of course, after mounting on the form, the cut portions are sewed in the usual manner and seams are covered by the fur or hairs of the skin.

In Figures 1 to 4, inclusive of the drawings, there is shown the knock-down sectional form upon which the head portion of the skin of the animal is mounted. This form is made of any suitable material such as light wood or plastic. It can be made of any material sufficiently rigid and light enough for the purpose intended.

The form includes an integral neck and head section 1 and 2, the latter terminating in a flat front 3 rearwardly of the mouth portion of the animal skin 4 when positioned thereon. An upper separate nose, upper jaw and lip conforming section of the form 5 is provided with nostril receiving depressions 6. This section of the form has a surface that conforms to the nose, upper jaw and lip contour of the animal and terminates rearwardly in a flat end provided with a pair of dowel pins 7 projecting therefrom and adapted to be received in recesses 8 in the flat front 3 of the head section 2 of the form to secure the portion or section in position. This section 5 is provided with a marginal depending flange 9 for a purpose to be hereinafter described. Forwardly of the head section 2 of the form is a separate lower lip and jaw conforming and receiving section 10 which underlies the portion 5. The section 10 is slightly narrower than the overlying section 5 as clearly shown in Figure 3. It has a flat top which when in position engages the flat underside of the upper section 5 within the confines of the flange 9. It otherwise conforms to the general configuration of the upper section 5. Within the outer surface of the head section 2 are sockets 11 for the reception of artificial eyes, (not shown), when the head portion of the animal skin is mounted on the form.

The top of the head section 2 is cut away to detachably receive a flat plate 12 conforming to the normal curvature of the head of the animal when the skin is mounted. The plate 12 can be held in the position shown in Figure 1 by lightly nailing the same in position so that it may be easily detached when desired. If the animal whose head is being mounted, as for instance a doe, does not have horns, then the plate 12 is used as shown. However, if a horned animal head is to be mounted, the plate 12 is removed and the portion of the animal's skull from which the horns grow is cut similar to the plate 12. The mount is then as shown in Figure 9 where the skull section is indicated at 13 and the horns and antlers at 14. Otherwise the forms used are identical.

The structure of the sectional form used having been described, the method of mounting a cured and cut head portion of an animal's skin thereon will now be set forth.

First, the cured and cut head portion of the animal skin diagrammatically shown in Figure 5 is held by the operator and then the upper section 5 of the form is inserted in the nose portion of the skin at the upper jaw covering portion thereof. The edge of the upper lip of the skin is turned over the flange 9 as shown in Figure 6 and tacked or adhesively united to the bottom of the section 9 adjacent the marginal flange. Then the lower section 10 of the form is inserted in the lower jaw covering portion of the skin and its lower lip edge turned over and tacked or adhesively united to the upper edge of the section 10. The variance in size of the sections of the form 5 and 10 permit the overlap shown in Figure 7. The bottom of section 5 or top of section 10 is adhesively coated and the mouth of the animal is then closed which unites the sections as shown in Figure 7. The nostril opening edges are then tucked in the depressions 6 of the upper section 5.

With the nose, jaw covering and lip portions of the skin mounted on the sections 5 and 10, the flat face 3 of the rest of the form is brought flush against the corresponding flat rear ends of the sections 5 and 10. The dowel pins 7 of the section 5 enter the recesses 8 in the flush face 3 and the entire form is held assembled as shown in Figure 8. The form is usually then adhesively coated and the skin 4 pulled back in place over the head 2 and neck 1 of the form. The cut portion is then sewed in the usual manner and conventional artificial eyes inserted in the sockets 11. Usually the end of the neck section of the form is secured to a wall plaque where the head is to be displayed chiefly as a trophy. If, however, the entire skin is to be mounted, it is pulled back over the preformed body and legs in a manner well understood.

Where for instance a buck or stag head is to be mounted, the plate 12 is removed and the portion of the animal's skull carrying the horns is cut to the size of the plate 12 and substituted therefor as shown at 12 in Figure 9. The skin 4 when drawn back over the form passes around slits for the horn bases (not shown). Thus the method of mounting is identical whether the animal has horns or not.

By the use of this novel sectional form and the method of mounting the skin thereon, a person with little or no knowledge of taxidermy may mount the head and the result achieved is a remarkably life like reproduction. The sectional arrangement of the form is such that the mounted head is very durable and will last over a long period of time with no deterioration. The facial expression is so rigidly fixed that it is maintained as mounted as long as the skin lasts.

It is to be understood that the present disclosure is illustrative of the invention but not restrictive; and that any desired changes and modifications may be made that are within the scope of the invention as claimed.

I claim:

1. A mount for an animal skin comprising a knockdown sectional head and neck form including a nose, upper jaw and lip skin conforming section, a lower jaw and lip skin conforming section, a head and neck skin conforming section, means for mounting a pair of horns on the head section, and means for securing said sections together.

2. A mount for an animal skin comprising a knockdown sectional head and neck form including a nose, upper jaw and lip skin conforming section, a lower jaw and lip skin conforming section, a head and neck skin conforming section, said head form having a cut-away portio adapted to receive a correspondingly cut section of the animal skull with horns, and means for securing said sections together.

3. A mount for an animal skin comprising a knockdown sectional head and neck form including a nose, upper jaw and lip skin conforming section, said section having a depending outer marginal flange, a lower jaw and lip skin conforming section slightly narrower than the aforesaid section and engageable therewith within the marginal flange, a head and neck skin conforming section, and means for securing said sections together.

4. The method of mounting the cured and cut head portion of an animal skin on a form comprising the steps of inserting in the nose portion of the skin a section of the form to which the nose and upper jaw portion of the skin conforms, inserting in the lower jaw portion of the skin a section of the form to which that portion of the skin conforms, uniting said connected sections with the flat front of a section of the form to which the head and neck portions of the skin conform, drawing the skin over the last mentioned section, and then connecting the cut edges of the skin for a snug engagement with the assembled form.

5. The method of mounting the cured and cut head portion of an animal skin on a form comprising the steps of inserting in the nose portion of the skin a section of the form to which the nose and upper jaw portion of the skin conforms, curling the upper lip of the skin over the outer edge of said section and securing it to the bottom edge thereof, inserting in the lower jaw portion of the skin a section of the form to which that portion of the skin conforms, curling the lower lip of the skin over the outer edge of said section and securing it to the top edge thereof, uniting said section in bottom and top surface relationship, uniting said connected sections with the flat front of a section of the form to which the head and neck portions conform, drawing the skin over the last mentioned section, and then connecting the cut edges of the skin for a snug engagement with the assembled form.

6. The method of mounting the cured and cut head portion of an animal skin on a form comprising the steps of inserting in the nose portion of the skin a section of the form to which the nose and upper jaw portion of the skin conforms, curling the upper lip of the skin over the outer edge of said section and securing it to the bottom edge thereof, inserting in the lower jaw portion of the skin a section of the form to which that portion of the skin conforms, curling the lower lip of the skin over the outer edge of said section and securing it to the top edge thereof, uniting said section in bottom and top surface relationship, uniting said connected sections with the flat front of a section of the form to which the head and neck portions conform, inserting in a cut-out portion in the top of the head section of the form a portion of the skull and horns of the animal, drawing the skin over the last mentioned section, and then connecting the cut edges of the skin for a snug engagement with the assembled form.

7. A mount for an animal skin comprising a knockdown sectional head and neck form including a nose, upper jaw and lip skin conforming section, a lower jaw and lip skin conforming section, a head and neck skin conforming section, and said sections each having engageable portions to permit sequential assembly during the mounting of an animal skin thereon.

8. A mount for an animal skin comprising a knockdown sectional head and neck form including a nose, upper jaw and lip skin conforming section, a lower jaw and lip skin conforming section, a head and neck skin conforming section, means for successively securing the conforming portions of a skin to each individual section, and said sections each having engageable portions to permit sequential assembly during the mounting of an animal skin thereon.

References Cited in the file of this patent

UNITED STATES PATENTS

| | | |
|---|---|---|
| 962,858 | Roman | June 28, 1910 |
| 1,432,704 | Lichtenstein | Oct. 17, 1922 |
| 1,840,507 | Hanks | Jan. 12, 1932 |
| 2,003,896 | Menger | June 4, 1935 |
| 2,124,767 | Dawn | July 26, 1938 |
| 2,203,891 | Burtenshaw | June 11, 1940 |